United States Patent
Shimizu (10) Patent No.: US 10,807,496 B2
(45) Date of Patent: Oct. 20, 2020

(54) VEHICLE POWER SUPPLY APPARATUS

(71) Applicant: SUBARU CORPORATION, Tokyo (JP)

(72) Inventor: Hirofumi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/371,566

(22) Filed: Apr. 1, 2019

(65) Prior Publication Data

US 2019/0299805 A1 Oct. 3, 2019

(30) Foreign Application Priority Data

Apr. 2, 2018 (JP) .................................. 2018-070905

(51) Int. Cl.

| | |
|---|---|
| *B60L 3/00* | (2019.01) |
| *B60L 58/12* | (2019.01) |
| *B60L 53/12* | (2019.01) |
| *B60L 53/14* | (2019.01) |
| *B60L 50/16* | (2019.01) |

(52) U.S. Cl.
CPC ............. *B60L 58/12* (2019.02); *B60L 3/0046* (2013.01); *B60L 53/12* (2019.02); *B60L 53/14* (2019.02); *B60L 50/16* (2019.02); *B60L 2240/547* (2013.01)

(58) Field of Classification Search
CPC .......... B60L 58/12; B60L 3/00; B60L 3/0046; B60L 53/12; B60L 53/14; B60L 53/18; B60L 53/122; B60L 53/124; B60L 53/126; B60L 50/16; B60L 2240/547

USPC ....................................................... 180/65.29
See application file for complete search history.

(56) References Cited

U.S. PATENT DOCUMENTS 10,377,245 B2 * 8/2019 Kinoshita ............... B60L 58/20
10,500,962 B2 * 12/2019 Kinoshito ............... B60L 58/13

FOREIGN PATENT DOCUMENTS

| JP | 2005-073467 A | 3/2005 |
|---|---|---|
| JP | 2013-256267 A | 12/2013 |

OTHER PUBLICATIONS

Japanese Notice of Reasons for Refusal issued in corresponding Japanese Patent Application No. 2018-070905, dated Dec. 17, 2019, with English translation.

* cited by examiner

*Primary Examiner* — John D Walters
(74) *Attorney, Agent, or Firm* — McDermott Will & Emery LLP (57) ABSTRACT

A vehicle power supply apparatus includes a first power supply system, a second power supply system, a switch, a switch controller, and an assistance controller. The first power supply system includes a first electrical energy accumulator and an electric device coupled thereto. The second power supply system includes an electric motor coupled to an engine, and a second electrical energy accumulator able to be coupled to the electric motor. The switch controller controls the switch to an electrically conductive state on the condition that a motor assistance control is about to be executed. The assistance controller inhibits the motor assistance control on the condition that a charge state and a discharge state of the first electrical energy accumulator become ungraspable.

19 Claims, 10 Drawing Sheets

VEHICLE POWER SUPPLY APPARATUS

CROSS-REFERENCE TO RELATED APPLICATIONS

This application claims priority from Japanese Patent Application No. 2018-070905 filed on Apr. 2, 2018, the entire contents of which are hereby incorporated by reference.

BACKGROUND

The technology relates to a vehicle power supply apparatus to be mounted on a vehicle.

As a vehicle power supply apparatus to be mounted on a vehicle, there has been proposed a power supply apparatus including two parallel-coupled accumulators. For example, reference can be made to Japanese Unexamined Patent Application Publication (JP-A) No. 2013-256267. The power supply apparatus described in JP-A No. 2013-256267 includes an electric motor coupled to an engine, and a switch that controls a coupling state between the accumulators.

SUMMARY

An aspect of the technology provides a vehicle power supply apparatus to be mounted on a vehicle that includes an engine. The vehicle power supply apparatus includes a first power supply system, a second power supply system, a switch, a switch controller, and an assistance controller. The first power supply system includes a first electrical energy accumulator and an electric device coupled to the first electrical energy accumulator. The second power supply system includes an electric motor coupled to the engine, and a second electrical energy accumulator able to be coupled to the electric motor. The switch is configured to be controlled to an electrically conductive state and a cutoff state. The electrically conductive state includes coupling the first power supply system and the second power supply system to each other. The cutoff state includes isolating the first power supply system and the second power supply system from each other. The switch controller is configured to control the switch to the electrically conductive state and the cutoff state on the basis of an operation state of the electric motor. The assistance controller is configured to control the electric motor to a powering state to execute a motor assistance control. The motor assistance control includes providing assistance to the engine. The switch controller controls the switch to the electrically conductive state on the condition that the motor assistance control is about to be executed. The assistance controller inhibits the motor assistance control on the condition that a charge state and a discharge state of the first electrical energy accumulator become ungraspable.

An aspect of the technology provides a vehicle power supply apparatus to be mounted on a vehicle that includes an engine. The vehicle power supply apparatus includes a first power supply system, a second power supply system, a switch, and circuitry. The first power supply system includes a first electrical energy accumulator and an electric device coupled to the first electrical energy accumulator. The second power supply system includes an electric motor coupled to the engine, and a second electrical energy accumulator able to be coupled to the electric motor. The switch is configured to be controlled to an electrically conductive state and a cutoff state. The electrically conductive state includes coupling the first power supply system and the second power supply system to each other. The cutoff state includes isolating the first power supply system and the second power supply system from each other. The circuitry is configured to control the switch to the electrically conductive state and the cutoff state on the basis of an operation state of the electric motor. The circuitry is configured to control the electric motor to a powering state to execute a motor assistance control. The motor assistance control includes providing assistance to the engine. The circuitry is configured to control the switch to the electrically conductive state on the condition that the motor assistance control is about to be executed. The circuitry is configured to inhibit the motor assistance control on the condition that a charge state and a discharge state of the first electrical energy accumulator become ungraspable.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

DETAILED DESCRIPTION

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

The power supply apparatus described in JP-A No. 2013-256267 executes a motor assistance control that includes allowing the electric motor to provide assistance to the engine. In executing the motor assistance control, the power supply apparatus described in JP-A No. 2013-256267 opens the switch to isolate one of the accumulators from the electric motor.

A possible alternative in executing the motor assistance control may be to close the switch, to couple the two accumulators to the electric motor. However, executing the motor assistance control with the switch kept closed may cause possibility of excessive discharge of the accumulators coupled to the electric motor through the switch.

It is desirable to provide a vehicle power supply apparatus that makes it possible to prevent excessive discharge of an accumulator.

[Vehicle Configuration]

Figure 1:
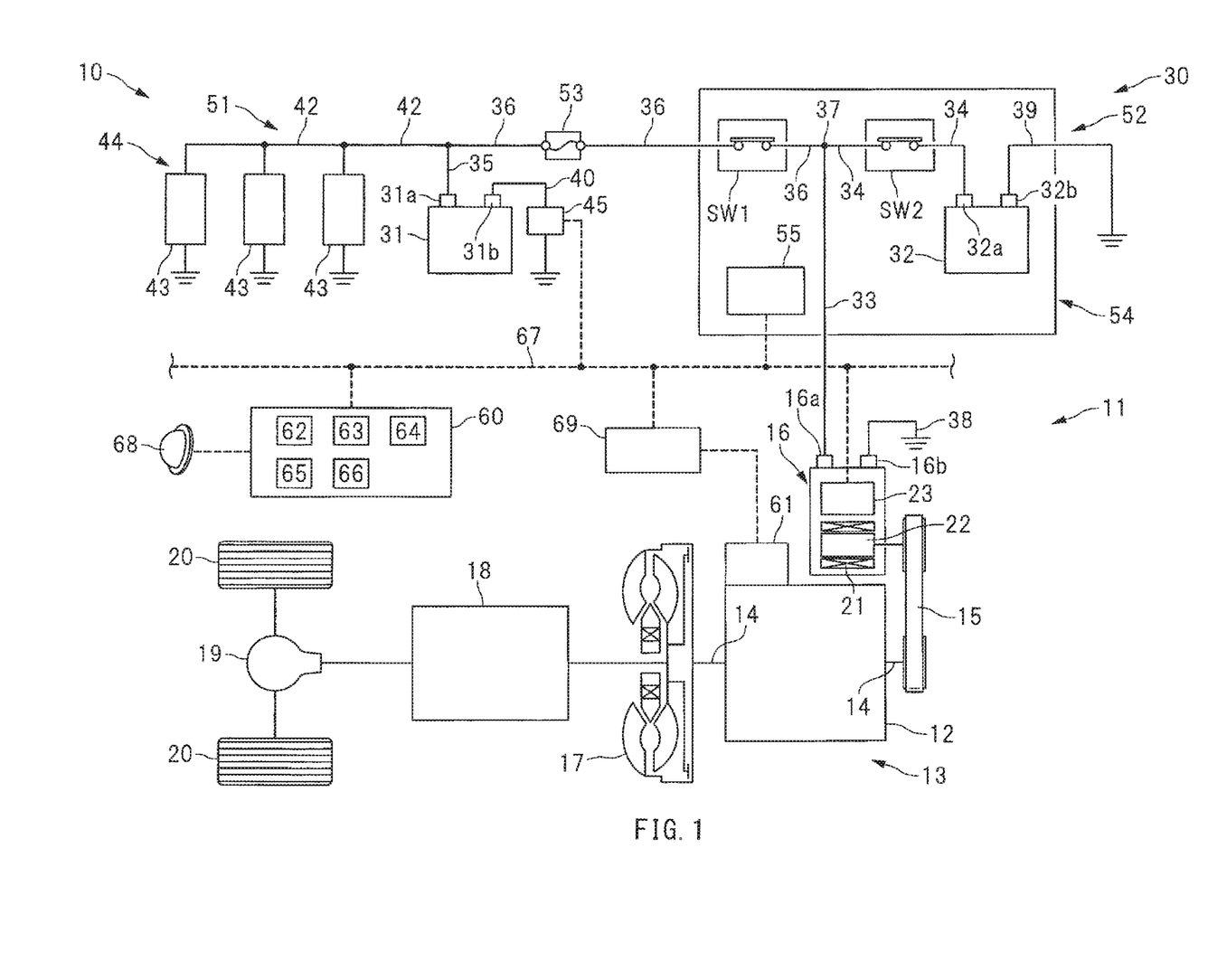
FIG. 1 is a schematic diagram of a configuration example of a vehicle on which a vehicle power supply apparatus according to one implementation of the technology is mounted.

FIG. 1 schematically illustrates a configuration example of a vehicle 11 on which a vehicle power supply apparatus 10 according to one implementation of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 is mechanically coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one implementation of the technology, the starter generator 16 may serve as an "electric motor".

The starter generator 16 coupled to the engine 12 may be a so-called integrated starter generator (ISG) that serves as a generator and an electric motor. Not only may the starter generator 16 serve as the generator driven by rotation of the crank shaft 14, the starter generator 16 may also serve as the electric motor that drives and causes the rotation of the crank shaft 14. For example, the starter generator 16 may be controlled to a powering state as the electric motor, in a case of a restart of the engine 12 in an idling stop control, or in a case of assist driving of the engine 12 at the time of, for example, a start and acceleration.

The starter generator 16 may include a stator 21 and a rotor 22. The stator 21 may include a stator coil. The rotor 22 may include a field coil. The starter generator 16 may further include an ISG controller 23, in order to control energized states of the stator coil and the field coil. The ISG controller 23 may include an inverter, a regulator, a microcomputer, and other parts. Allowing the ISG controller 23 to control the energized states of the field coil and the stator coil makes it possible to control, for example but not limited to, a power generation voltage, power generation torque, and motor torque, i.e., powering torque, of the starter generator 16.

[Power Circuit]

Figure 2:
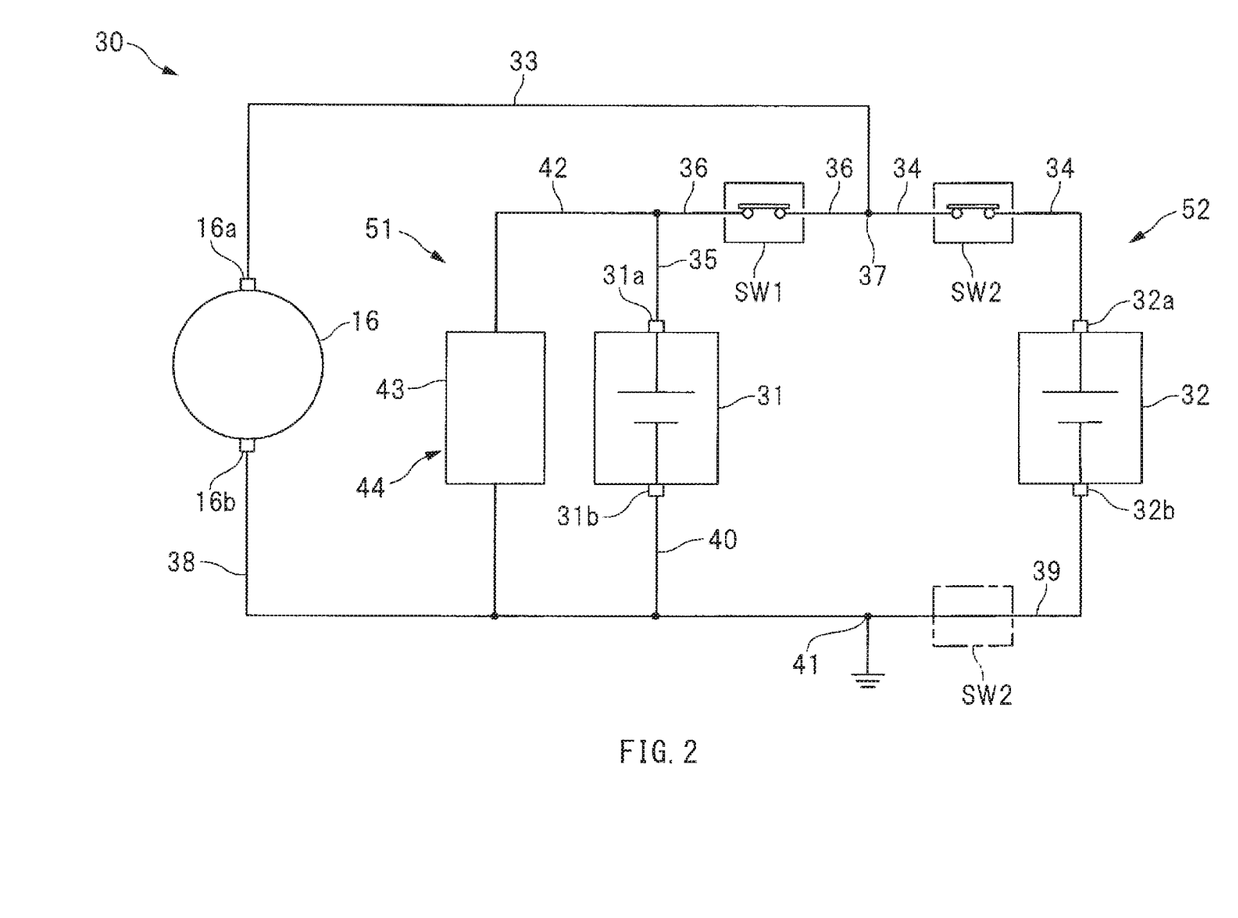
FIG. 2 is a circuit diagram of a simplified example of a power circuit.

The vehicle power supply apparatus 10 may include a power circuit 30, description of which is given below. FIG. 2 is a circuit diagram of a simplified example of the power circuit 30. Referring to FIG. 2, the power circuit 30 may include a lead battery 31 and a lithium ion battery 32. The lead battery 31 may be electrically coupled to the starter generator 16. The lithium ion battery 32 may be electrically coupled, in parallel with the lithium ion battery 32, to the starter generator 16. It is to be noted that a terminal voltage of the lithium ion battery 32 may be higher in design than a terminal voltage of the lead battery 31, in order to positively cause discharge of the lithium ion battery 32. Moreover, internal resistance of the lithium ion battery 32 may be lower in design than internal resistance of the lead battery 31, in order to positively cause charge and the discharge of the lithium ion battery 32.

In one implementation of the technology, the lead battery 31 may serve as a "first electrical energy accumulator". In one implementation of the technology, the lithium ion battery 32 may serve as a "second electrical energy accumulator".

A positive electrode line 33 may be coupled to a positive electrode terminal 16a of the starter generator 16. A positive electrode line 34 may be coupled to a positive electrode terminal 32a of the lithium ion battery 32. A positive electrode line 36 may be coupled to a positive electrode terminal 31a of the lead battery 31 through a positive electrode line 35. The positive electrode lines 33, 34, and 36 may be coupled to one another through a connection point 37. Moreover, a negative electrode line 38 may be coupled to a negative electrode terminal 16b of the starter generator 16. A negative electrode line 39 may be coupled to a negative electrode terminal 32b of the lithium ion battery 32. A negative electrode line 40 may be coupled to a negative electrode terminal 31b of the lead battery 31. The negative electrode lines 38, 39, and 40 may be coupled to one another through a reference potential point 41.

To the positive electrode line 35 of the lead battery 31, coupled may be a positive electrode line 42. To the positive electrode line 42, coupled may be a group of electric devices 44 including electric devices 43 such as various actuators and various controllers. Moreover, to the negative electrode line 40 of the lead battery 31, coupled may be a battery sensor 45. For the battery sensor 45, refer to FIG. 1. The battery sensor 45 may have a function of detecting a charge state and a discharge state of the lead battery 31. Non-limiting examples of the charge state and the discharge state of the lead battery 31 may include a charge current, a discharge current, the terminal voltage, a state of charge SOC of the lead battery 31. It is to be noted that the state of charge SOC refers to a ratio of an amount of charged power to a designed capacity of a battery.

In one implementation of the technology, the battery sensor 45 may serve as a "charge and discharge detector".

The power circuit 30 includes a first power supply system 51 and a second power supply system 52. The first power supply system 51 includes the lead battery 31 and the electric devices 43. The second power supply system 52 includes the lithium ion battery 32 and the starter generator 16. The first power supply system 51 and the second power supply system 52 may be coupled to each other through the positive electrode line 36 as an energization path. On the positive electrode line 36, provided may be an electric power fuse 53 and a first switch SW1. The electric power fuse 53 is configured to be melted down by an excessive current. The first switch SW1 is configured to be controlled to an ON state and an OFF state. Note that hereinafter the first switch SW1 is also referred to simply as the switch SW1. Moreover, on the positive electrode line 34 of the lithium ion battery 32, provided may be a second switch SW2. The second switch SW2 is configured to be controlled to an ON state and an OFF state. Note that hereinafter the second switch SW2 is also referred to simply as the switch SW2.

In one implementation of the technology, the first switch SW1 may serve as a "switch". In one implementation of the technology, the ON state may serve as an "electrically conductive state", and the OFF state may serve as a "cutoff state".

Controlling the switch SW1 to the ON state, or a closed circuit state, makes it possible to couple the first power supply system 51 and the second power supply system 52 to each other. Controlling the switch SW1 to the OFF state, or an opened circuit state, makes it possible to isolate the first power supply system 51 and the second power supply system 52 from each other. Moreover, controlling the switch SW2 to the ON state, or a closed circuit state, makes it possible to couple the lithium ion battery 32 to the starter generator 16. Controlling the switch SW2 to the OFF state, or an opened circuit state, makes it possible to isolate the lithium ion battery 32 from the starter generator 16. The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. It is to be noted that the switches SW1 and SW2 may be also referred to as, for example, a relay or a contactor.

As illustrated in FIG. 1, the power circuit 30 may include a battery module 54. Not only the lithium ion battery 32 but also the switches SW1 and SW2 may be incorporated in the battery module 54. The battery module 54 may further include a battery controller 55. The battery controller 55 may include, for example but not limited to, a microcomputer. The battery controller 55 may have a function of monitoring, for example but not limited to, a state of charge SOC, a charge current, a discharge current, the terminal voltage, a cell temperature, and the internal resistance of the lithium ion battery 32. The battery controller 55 may also have a function of controlling the switches SW1 and SW2.

[Control System]

As illustrated in FIG. 1, the vehicle power supply apparatus 10 may include a main controller 60. The main controller 60 is provided for a cooperative control of, for example but not limited to, the power unit 13 and the power circuit 30. The main controller 60 may include, for example but not limited to, a microcomputer. The main controller 60 may include, for example but not limited to, an engine control unit 62, a motor control unit 63, a switch control unit 64, an idling control unit 65, and a sensor monitoring unit 66. The engine control unit 62 may control engine auxiliaries 61 such as a throttle valve and an injector. The motor control unit 63 may control the starter generator 16. The switch control unit 64 may control the switches SW1 and SW2. The idling control unit 65 may execute the idling stop control. The sensor monitoring unit 66 may detect a malfunction of the battery sensor 45.

In one implementation of the technology, the motor control unit 63 may serve as an "assistance controller".

The main controller 60, the ISG controller 23, the battery controller 55, and an engine controller 69 described later may be communicatively coupled to one another through an on-vehicle network 67 such as a controller area network (CAN) and a local interconnect network (LIN). Moreover, not only the battery sensor 45 but also undepicted sensors, e.g., an accelerator sensor, a brake sensor, and a vehicle speed sensor may be coupled to the main controller 60. Thus, on the basis of information from the controllers and the sensors, the main controller 60 may control the power unit 13 and the power circuit 30, and other parts. Moreover, to the main controller 60, coupled may be a warning lamp 68 that notifies an occupant of a vehicle malfunction.

The idling control unit 65 of the main controller 60 may execute the idling stop control. The idling stop control includes automatically stopping and restarting the engine 12. The idling control unit 65 may execute, for example but not limited to, a fuel cut to stop the engine 12, in a case where a predetermined stop condition is satisfied while the engine 12 is in operation. The idling control unit 65 may bring the starter generator 16 to starting rotation to restart the engine 12, in a case where a predetermined start condition is satisfied while the engine 12 is stopped. Non-limiting examples of the stop condition of the engine 12 may include that a vehicle speed is lower than a predetermined value, with a brake pedal being stepped down. Non-limiting examples of the start condition of the engine 12 may include that stepping down of the brake pedal is released, and that stepping down of an accelerator pedal is started.

The motor control unit 63 of the main controller 60 may output a control signal to the ISG controller 23, to control the starter generator 16 to the powering state or a power generation state. In one specific but non-limiting example, the motor control unit 63 may control the starter generator 16 to the powering state in the case of the restart of the engine 12 in the idling stop control. Moreover, the motor control unit 63 may control the starter generator 16 to the powering state at the time of, for example, the start and the acceleration, to execute the motor assistance control. The motor assistance control includes allowing the starter generator 16 to provide the assistance to the engine 12. Furthermore, as described later, in a case with a decrease in the state of charge SOC of the lithium ion battery 32, the motor control unit 63 may raise the power generation voltage of the starter generator 16, to control the starter generator 16 to a combustion power generation state. In a case with an increase in the state of charge SOC of the lithium ion battery 32, the motor control unit 63 may lower the power generation voltage of the starter generator 16, to control the starter generator 16 to a power generation suspended state.

The engine control unit 62 of the main controller 60 may control an operation state of the engine auxiliaries 61, through the engine controller 69. The engine controller 69 may include, for example but not limited to, a microcomputer. The switch control unit 64 of the main controller 60 may control operation states of the switches SW1 and SW2, through the battery controller 55.

[Power Generation Control of Starter Generator]

Description is given of a power generation control of the starter generator 16. The main controller 60 may set a target power generation voltage of the starter generator 16, on the basis of the state of charge SOC of the lithium ion battery 32. The main controller 60 may supply the target power generation voltage to the ISG controller 23, and control the starter generator 16 to the combustion power generation state or the power generation suspended state, which are described later.

Figure 3:
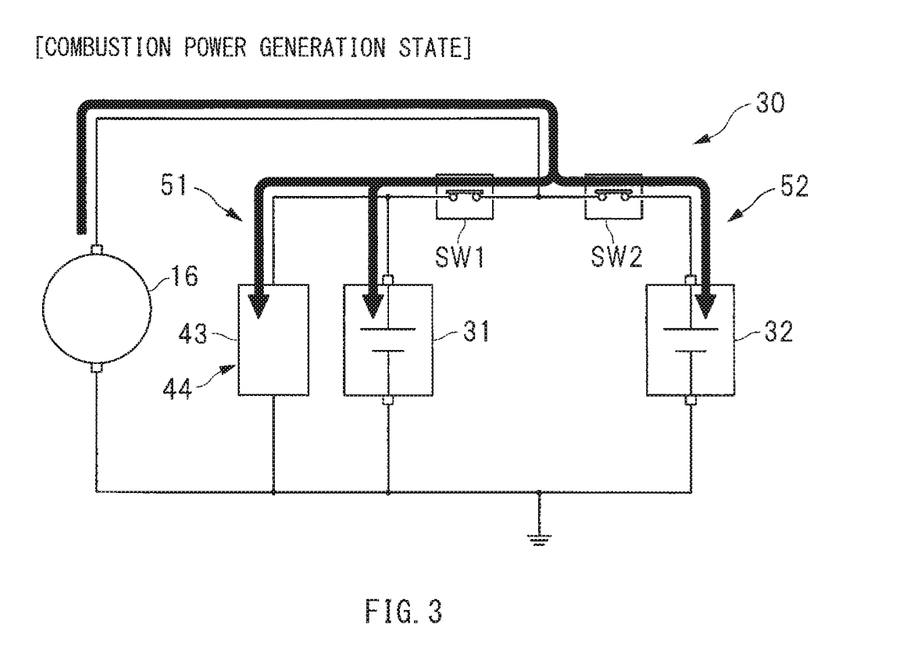
FIG. 3 is a diagram of an example of a situation as to how currents are supplied, with a starter generator controlled to a combustion power generation state.

FIG. 3 illustrates an example of a situation as to how currents are supplied, with the starter generator 16 controlled to the combustion power generation state. In one specific but non-limiting example, in a case where the state of charge SOC of the lithium ion battery 32 is lower than a predetermined lower limit, the starter generator 16 may be driven, by engine power, for power generation, in order to charge the lithium ion battery 32 and to increase the state of charge SOC. Thus, in controlling the starter generator 16 to the combustion power generation state, the power generation voltage may be raised, to make an adjustment so that the power generation voltage to be applied to the lithium ion battery 32 becomes higher than the terminal voltage. In this way, as denoted by black arrows in FIG. 3, currents may be supplied from the starter generator 16 to, for example, the lithium ion battery 32 and the lead battery 31, causing the lithium ion battery 32 and the lead battery 31 to be charged slowly.

Figure 4:
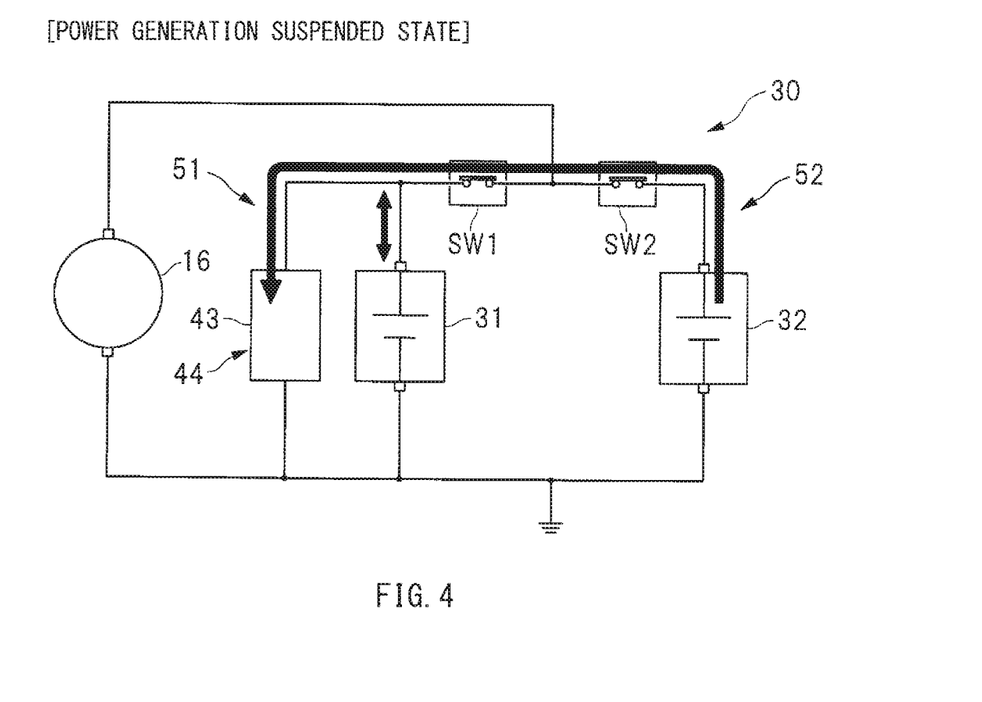
FIG. 4 is a diagram of an example of a situation as to how currents are supplied, with the starter generator controlled to a power generation suspended state.

FIG. 4 illustrates an example of a situation as to how currents are supplied, with the starter generator 16 controlled to the power generation suspended state. In one specific but non-limiting example, in a case where the state of charge SOC of the lithium ion battery 32 is higher than a predetermined upper limit, driving the starting generator 16, by the engine power, for the power generation may be stopped, in order to positively cause the discharge of the lithium ion battery 32. Thus, in controlling the starter generator 16 to the power generation suspended state, the power generation voltage of the starter generator 16 may be lowered, to make an adjustment so that the power generation voltage to be applied to the lithium ion battery 32 becomes lower than the terminal voltage. In this way, as denoted by black arrows in FIG. 4, a current may be supplied from the lithium ion battery 32 to the group of the electric devices 44. This makes it possible to suppress or stop the driving of the starter generator 16 for the power generation, leading to reduction in an engine load.

As mentioned above, the main controller 60 may control the starter generator 16 to the combustion power generation state or the power generation suspended state on the basis of the state of charge SOC. Meanwhile, at the time of vehicle deceleration, it is necessary to recover much kinetic energy to enhance fuel consumption performance. Therefore, at the time of the vehicle deceleration, the power generation voltage of the starter generator 16 may be raised considerably, to control the starter generator 16 to a regenerative power generation state. This makes it possible to increase regenerative power, i.e., generated power, of the starter generator 16, and to positively convert the kinetic energy to electric energy and to recover the electric energy, leading to higher energy efficiency of the vehicle 11 and enhancement in the fuel consumption performance.

A determination as to whether or not to control the starter generator 16 to the regenerative power generation state may be made on the basis of, for example but not limited to, operation states of the accelerator pedal and the brake pedal. For example, on decelerated travel with a release of stepping down of the accelerator pedal, or on decelerated travel with stepping down of the brake pedal, the situation is that the engine 12 is about to be controlled to a fuel cut state. Accordingly, the starter generator 16 may be controlled to the regenerative power generation state. Meanwhile, on accelerated travel with the stepping down of the accelerator pedal, or on steady travel, the situation is that the engine 12 is about to be controlled to a fuel injection state. Accordingly, the starter generator 16 may be controlled to the combustion power generation state or the power generation suspended state.

Figure 5:
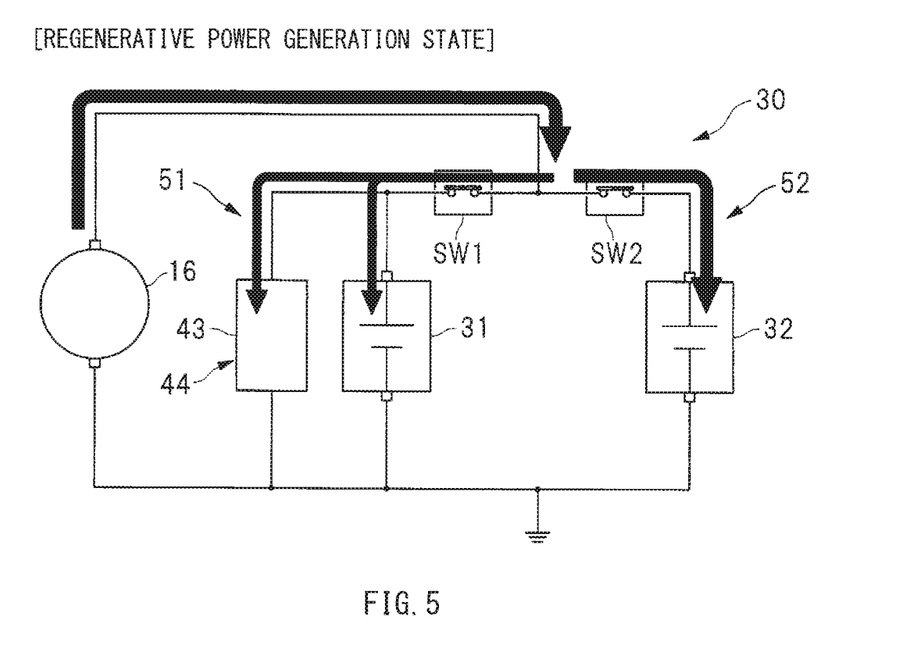
FIG. 5 is a diagram of an example of a situation as to how currents are supplied, with the starter generator controlled to a regenerative power generation state.

FIG. 5 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. Thus, the power generation voltage to be applied to the lithium ion battery 32 may be brought to a higher value than the terminal voltage. This causes large current supply from the starter generator 16 to the lithium ion battery 32 and the lead battery 31, as denoted by black arrows in FIG. 5, resulting in rapid charge of the lithium ion battery 32 and the lead battery 31. Moreover, because the internal resistance of the lithium ion battery 32 is smaller than the internal resistance of the lead battery 31, most of the power-generated current is supplied to the lithium ion battery 32.

It is to be noted that as illustrated in FIGS. 3 to 5, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 32 solely by controlling the power generation voltage of the starter generator 16 without making a switching control of the switches SW1 and SW2. Hence, it is possible to easily control the charge and the discharge of the lithium ion battery 32, and to enhance durability of the switches SW1 and SW2.

[Switching Control of Switch SW1]

Described is the switching control of the switch SW1 in accompaniment with a powering control of the starter generator 16. As mentioned above, in controlling the starter generator 16 to the combustion power generation state, the regenerative power generation state, and the power generation suspended state, the switches SW1 and SW2 may both be kept in the ON state. In contrast, in controlling the starter generator 16 to the powering state, power consumption changes in accordance with an operation state of the starter generator 16. Therefore, as described later, the switch SW1 is controlled to the ON state or the OFF state in accordance with the operation state of the starter generator 16.

Figure 6:
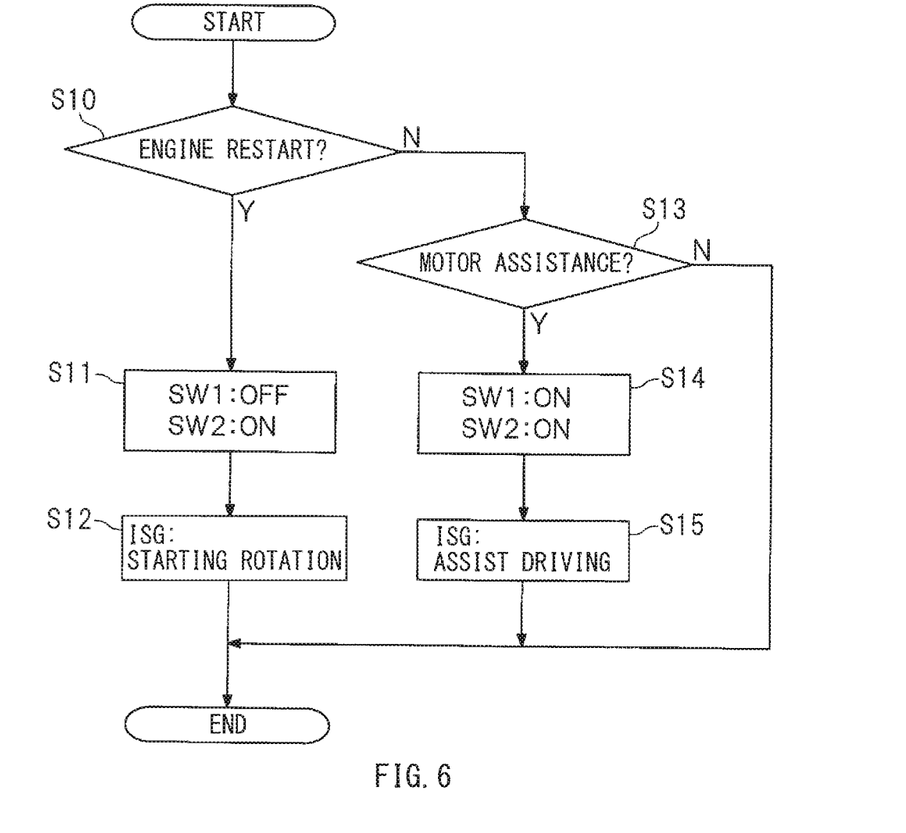
FIG. 6 is a flowchart of an example of an execution procedure in a switching control of a switch.
Figure 7:
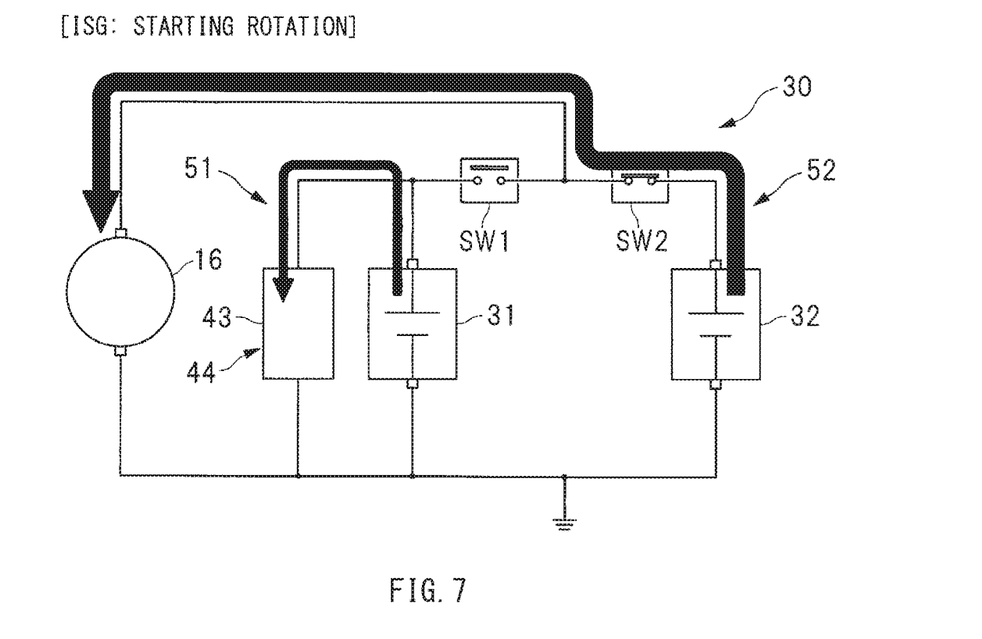
FIG. 7 is a diagram of an example of a situation as to how currents are supplied, with the starter generator engaged in starting rotation.
Figure 8:
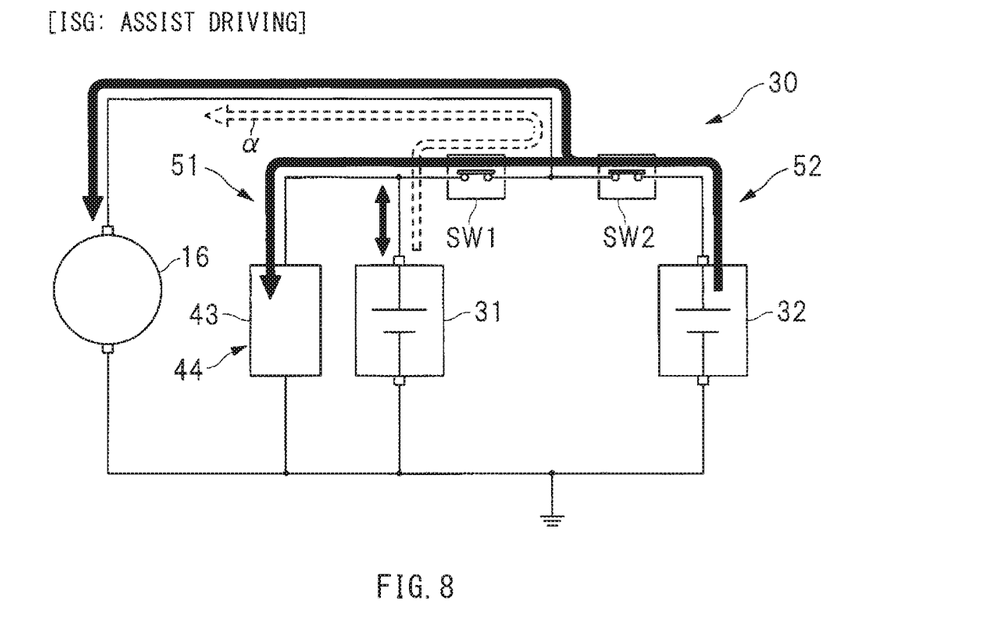
FIG. 8 is a diagram of an example of a situation as to how currents are supplied, with the starter generator engaged in assist driving.
Figure 9:
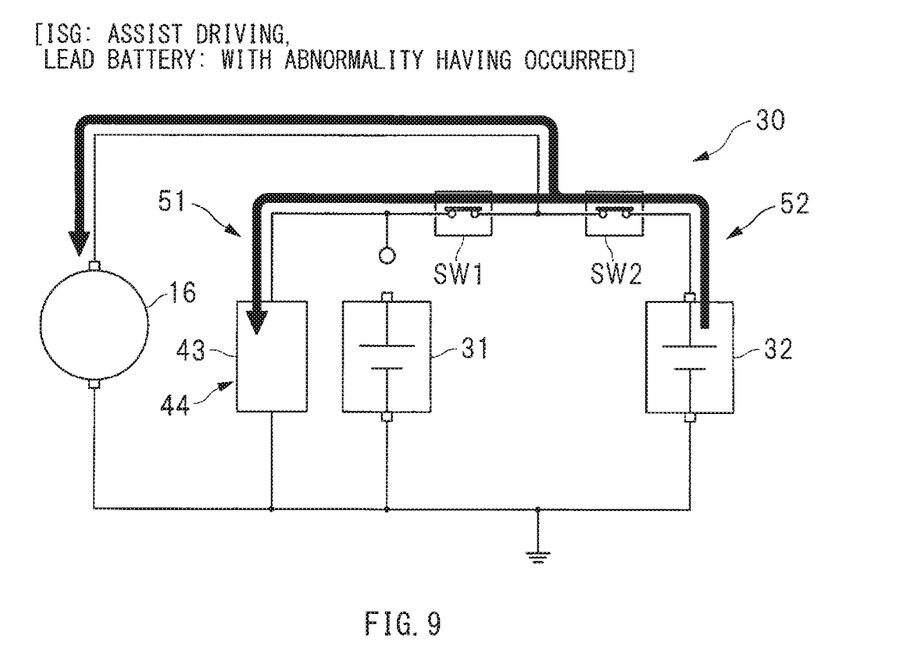
FIG. 9 is a diagram of an example of a situation as to how currents are supplied, with the starter generator engaged in the assist driving.

FIG. 6 is a flowchart illustrating an example of an execution procedure in the switching control of the switch SW1. FIG. 7 illustrates an example of a situation as to how currents are supplied, with the starter generator 16 engaged in the starting rotation. FIGS. 8 and 9 illustrate an example of a situation as to how currents are supplied, with the starter generator 16 engaged in the assist driving. It is to be noted that in FIGS. 6 to 9, the starter generator 16 is abbreviated to "ISG". In FIGS. 7 to 9, the situations as to how the currents are supplied are denoted with the use of black arrows.

Referring to FIG. 6, in step S10, a determination may be made as to whether or not the situation is that an engine restart by the idling stop control is about to be executed. In other words, in step S10, a determination may be made as to whether or not the predetermined start condition is satisfied while the engine 12 is stopped by the idling stop control. For example, in step S10, in a case with a release of the stepping down of the brake pedal, or in a case with a start of the stepping down of the accelerator pedal, a determination may be made that the start condition of the engine 12 is satisfied. Thus, a determination may be made that the engine restart by the starter generator 16 is about to be executed.

In step S10, in the case with the determination that the engine restart is about to be executed (Y in step S10), the flow may proceed to step S11. In step S11, the switch SW1 may be controlled to the OFF state, while the switch SW2 may be controlled to the ON state. Thereafter, the flow may proceed to step S12. In step S12, cranking, i.e., the starting rotation of the engine 12, may be executed by the starter generator 16. As illustrated in FIG. 7, in engaging the starter generator 16 in the starting rotation, the switch SW1 may be switched from the ON state to the OFF state, causing isolation of the first power supply system 51 and the second power supply system 52 from each other. In other words, engaging the starter generator 16 in the starting rotation is accompanied by a rapid increase in the power consumption of the starter generator 16, which constitutes a reason for the isolation of the first power supply system 51 and the second power supply system 52 from each other. The isolation of the first power supply system 51 and the second power supply system 52 from each other prevents a current flow from the lead battery 31 to the starter generator 16. This leads to appropriate current supply from the lead battery 31 to the group of the electric devices 44. Hence, it is possible to prevent an instantaneous voltage drop with respect to the group of the electric devices 44, and to allow the group of the electric devices 44 to function appropriately.

Meanwhile, in step S10 in FIG. 6, in a case with a determination that the engine restart is not about to be executed (N in step S10), the flow may proceed to step S13. In step S13, a determination may be made as to whether or not the situation is that the motor assistance control, i.e., the assist driving of the engine 12 by the starter generator 16, is about to be executed. In step S13, the determination as to whether or not the situation is that the motor assistance control is about to be executed may be made on the basis of, for example but not limited to, the vehicle speed, an amount of the stepping down of the accelerator pedal, an engine speed, and the state of charge SOC of the lithium ion battery 32. In one specific but non-limiting example, at the time of, for example, the start and the acceleration, a determination may be made that the motor assistance control is about to be executed.

In step S13, in a case with a determination that the motor assistance control is not about to be executed (N in step S13), the flow may be terminated.

In step S13, in the case with the determination that the motor assistance control is about to be executed (Y in step S13), the flow may proceed to step S14. In step S14, the switches SW1 and SW2 may both be controlled to the ON state. Thereafter, the flow may proceed to step S15, in which the assist driving by the starter generator 16 may be executed. As illustrated in FIG. 8, in a case with the assist driving by the starter generator 16, the switch SW1 is kept in the ON state. This causes the coupling of both the lead battery 31 and the lithium ion battery 32 to the group of the electric devices 44. Hence, it is possible to allow the group of the electric devices 44 to function appropriately, even in a case where an abnormality occurs in the lead battery 31, as described later. This leads to enhancement in reliability of the vehicle power supply apparatus 10.

Power consumption involved in the assist driving by the starter generator 16 is smaller than power consumption involved in the starting rotation by the starter generator 16. In other words, the starting rotation by the starter generator 16 is an operation state in which the engine 12 stopped is caused by the starter generator 16 to start to rotate. In the starting rotation, the motor torque to be requested is large, and the power consumption of the starter generator 16 easily increases. In contrast, the assist driving by the starter generator 16 is an operation state in which the engine 12 in rotation is supplementarily driven by the starter generator 16. In the assist driving, the motor torque to be requested is small, and the power consumption of the starter generator 16 is reduced. As described above, because the power consumption of the starter generator 16 is reduced in the assist driving by the starter generator 16, keeping the switch SW1 in the ON state does not result in a large current flow from the lead battery 31 to the starter generator 16. Hence, it is possible to provide sufficient electric power supply to the group of the electric devices 44, from the lead battery 31 and the lithium ion battery 32.

As described above, in the case where the starter generator 16 is engaged in the assist driving, the switch SW1 is kept in the ON state. Accordingly, both the lead battery 31 and the lithium ion battery 32 are coupled to the group of the electric devices 44. This makes it possible to allow the group of the electric devices 44 to function appropriately even in the case where the abnormality occurs in the lead battery 31. Hence, it is possible to enhance the reliability of the vehicle power supply apparatus 10. As illustrated in FIG. 9, even in the case where the abnormality, e.g., coming off of a terminal, occurs in the lead battery 31 during the assist driving by the starter generator 16, it is possible to continue electric power supply to the group of the electric devices 44 from the lithium ion battery 32. Hence, it is possible to allow the group of the electric devices 44 to function appropriately, leading to the enhancement in the reliability of the vehicle power supply apparatus 10.

[Fail-Safe Control in Accompaniment with Battery Sensor Malfunction]

As mentioned above, in the case where the starter generator 16 is engaged in the assist driving, the switch SW1 is kept in the ON state. In other words, the starter generator 16 and the lead battery 31 are coupled to each other. This may cause possibility of a current flow from the lead battery 31 to the starter generator 16, as denoted by a broken arrow a in FIG. 8, depending on the power consumption of the starter generator 16 and the state of charge SOC of the lithium ion battery 32. Therefore, the main controller 60 may monitor the charge state and the discharge state of the lead battery 31 with the use of the battery sensor 45, to execute the motor assistance control while preventing excessive discharge of the lead battery 31. For example, in a case with the excessive discharge of the lead battery 31, the motor torque may be reduced, to lower the power consumption of the starter generator 16. However, for example, in a case with a malfunction of the battery sensor 45, or in a case with failure in the on-vehicle network 67, it becomes difficult to monitor the charge state and the discharge state of the lead battery 31, causing possibility of the excessive discharge of the lead battery 31. Thus, the main controller 60 may execute a fail-safe control as follows, in the case where the battery sensor 45 malfunctions, in order to prevent the excessive discharge of the lead battery 31.

Figure 10:
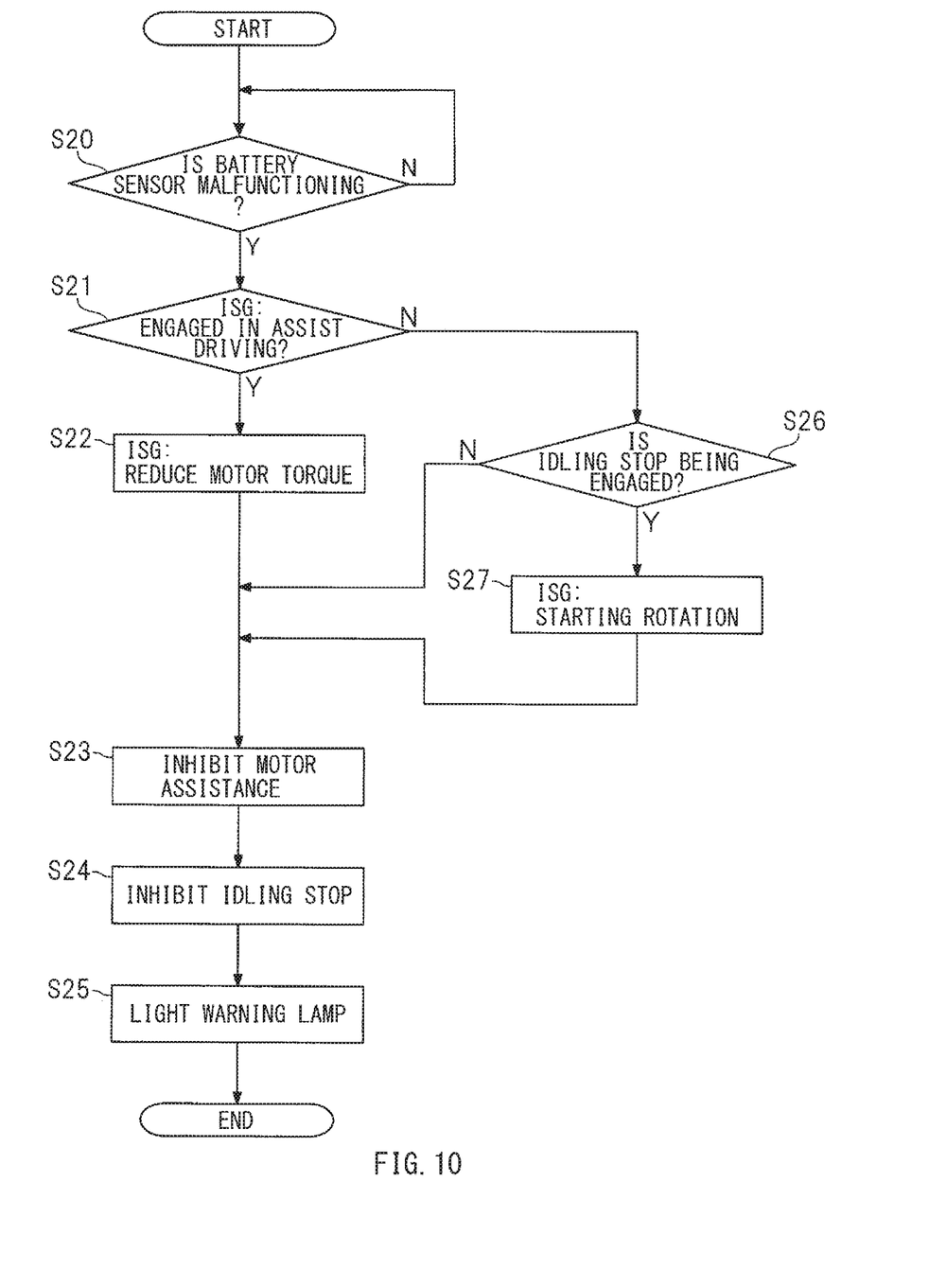
FIG. 10 is a flowchart of an example of an execution procedure of a fail-safe control.

FIG. 10 is a flowchart illustrating an example of an execution procedure of the fail-safe control. Referring to FIG. 10, in step S20, a determination may be made as to whether or not the battery sensor 45 of the lead battery 31 is in a malfunctioning state, on the basis of a detection result by the sensor monitoring unit 66. Specific but non-limiting examples of the malfunctioning state of the battery sensor 45 may include a failure in detecting, for example, the charge current and the discharge current, and a failure in transmitting information regarding, for example, the charge current and the discharge current. In step S20, in a case with a determination that the battery sensor 45 is malfunctioning (Y in step S20), the flow may proceed to step S21. In step S21, a determination may be made as to whether or not the starter generator 16 is engaged in the assist driving. In step S21, in a case with a determination that the starter generator 16 is engaged in the assist driving (Y in step S21), the flow may proceed to step S22. In step S22, the motor torque of the starter generator 16 may be gradually reduced. Thereafter, the flow may proceed to step S23, in which the motor assistance control is inhibited. Furthermore, the flow may proceed to step S24, in which the idling stop control may be inhibited. Thereafter, the flow may proceed to step S25, in which the warning lamp 68 may be lighted, to notify an occupant of the malfunction of the battery sensor 45.

In step S20, in a case with a determination that the battery sensor 45 is not malfunctioning (N in step S20), the processing in step S20 may be repeated.

In step S21, in a case with a determination that the starter generator 16 is not engaged in the assist driving (N in step S21), the flow may proceed to step S26. In step S26, a determination may be made as to whether or not the idling stop control is being engaged, that is, whether or not the engine 12 is stopped by the idling stop control. In step S26, in a case with a determination that the engine 12 is not stopped (N in step S26), that is, in a case with a determination that neither the motor assistance control nor the idling stop control is not being executed, the flow may proceed to step S23, in which the motor assistance control is inhibited. Furthermore, the flow may proceed to step S24, in which the idling stop control may be inhibited. Thereafter, the flow may proceed to step S25, in which the warning lamp 68 may be lighted.

In step S26, in a case with a determination that the engine 12 is stopped (Y in step S26), the flow may proceed to step S27. In step S27, the starter generator 16 may be engaged in the starting rotation, to restart the engine 12. As mentioned above, in the case where the battery sensor 45 malfunctions while the engine 12 is stopped by the idling stop control, the engine 12 may be allowed to restart without waiting for the start condition to be satisfied. Specifically, in the case where the battery sensor 45 malfunctions, it is difficult to grasp the charge state and the discharge state of the lead battery 31. Therefore, the engine 12 may be quickly restarted from viewpoint of avoidance of the excessive discharge of the lead battery 31. At the restart of the engine 12, the flow may proceed to step S23, in which the motor assistance control is inhibited. Furthermore, the flow may proceed to step S24, in which the idling stop control may be inhibited. Thereafter, the flow may proceed to step S25, in which the warning lamp 68 may be lighted.

As described, the main controller 60 may inhibit the motor assistance control by the starter generator 16, in the case where the battery sensor 45 of the lead battery 31 malfunctions. Specifically, with the charge state and the discharge state of the lead battery 31 being ungraspable, the assist driving by the starter generator 16 is inhibited. This prevents a large amount of currents from flowing from the lead battery 31 to the starter generator 16, leading to prevention of the excessive discharge of the lead battery 31. Moreover, in the case where the battery sensor 45 malfunctions while the motor assistance control is being executed, the motor assistance control may be inhibited after gradually reducing the motor torque, i.e., the powering torque, of the starter generator 16. Hence, it is possible to inhibit the motor assistance control without giving the occupant the sense of incongruity in accompaniment with torque variations. It is to be noted that in gradually reducing the motor torque, the motor torque may be reduced stepwise, or alternatively, the motor torque may be reduced continuously.

Moreover, in the case where the battery sensor 45 of the lead battery 31 malfunctions, the main controller 60 may inhibit the idling stop control. Specifically, with the charge state and the discharge state of the lead battery 31 being ungraspable, the starter generator 16 may be inhibited from restarting the engine 12. This makes it possible to keep the switch SW1 in the ON state, to couple the lithium ion battery 32 to the group of the electric devices 44. Hence, it is possible to stabilize electric power supply to the group of the electric devices 44. Moreover, in the case where the battery sensor 45 malfunctions while the engine 12 is stopped by the idling stop control, the idling stop control may be inhibited after the restart of the engine 12 by the starter generator 16. Hence, it is possible to inhibit the idling stop control while maintaining travel performance of the vehicle 11.

Although some preferred implementations of the technology are described above by way of example with reference to the accompanying drawings, the technology is by no means limited to the implementations described above. It should be appreciated that modifications and alterations may be made by persons skilled in the art without departing from the scope as defined by the appended claims. In the forgoing example implementations of the technology, the vehicle power supply apparatus 10 includes the switch SW2, but this is non-limiting. The switch SW2 may be eliminated from the vehicle power supply apparatus 10. Moreover, in the illustrated example implementations of the technology, the switches SW1 and SW2 are incorporated in the battery module 54, but this is non-limiting. The switches SW1 and SW2 may be provided outside the battery module 54. Furthermore, in the forgoing example implementations of the technology, the switch SW2 is provided on the positive electrode line 34 of the lithium ion battery 32, but this is non-limiting. For example, as denoted by an alternate long and short dashed line in FIG. 2, the switch SW2 may be provided on the negative electrode line 39 of the lithium ion battery 32.

In the forgoing example implementations of the technology, the lead battery 31 may serve as the "first electrical energy accumulator", and the lithium ion battery 32 may serve as the "second electrical energy accumulator", but this is non-limiting. Other kinds of batteries and capacitors may be adopted. Moreover, the "first electrical energy accumulator" and the "second electrical energy accumulator" do not have to be accumulators of different kinds, but they may be accumulators of the same kind. In the forgoing example implementations of the technology, the starter generator 16 that also functions as the generator may serve as the "electric motor", but this is non-limiting. An electric motor that functions solely as an electric motor may be adopted. Moreover, in the forgoing example implementations of the technology, the main controller 60 includes the motor control unit 63, the switch control unit 64, and the idling control unit 65, but this is non-limiting. For example, the motor control unit 63, the switch control unit 64, or the idling control unit 65, or any combination thereof may be provided in other controllers, or alternatively, the motor control unit 63 the switch control unit 64, and the idling control unit 65 may be distributed over a plurality of controllers.

According to the example implementations of the technology, the motor assistance control is inhibited in the case where the charge state and the discharge state of the first electrical energy accumulator become ungraspable because of, for example, the malfunction of the charge and discharge detector. Hence, it is possible to prevent the excessive discharge of the first electrical energy accumulator.

The main controller 60, the motor control unit 63, the switch control unit 64, and the idling control unit 65 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60, the motor control unit 63, the switch control unit 64, and the idling control unit 65. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 60, the motor control unit 63, the switch control unit 64, and the idling control unit 65 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
   a first power supply system including a first electrical energy accumulator and an electric device coupled to the first electrical energy accumulator;
   a second power supply system including an electric motor coupled to the engine, and a second electrical energy accumulator able to be coupled to the electric motor;
   a switch configured to be controlled to an electrically conductive state and a cutoff state, the electrically conductive state including coupling the first power supply system and the second power supply system to each other, and the cutoff state including isolating the first power supply system and the second power supply system from each other;
   a switch controller configured to control the switch to the electrically conductive state and the cutoff state on a basis of an operation state of the electric motor; and
   an assistance controller configured to control the electric motor to a powering state to execute a motor assistance control, the motor assistance control including providing assistance to the engine,
   the switch controller controlling the switch to the electrically conductive state on a condition that the motor assistance control is about to be executed, and
   the assistance controller inhibiting the motor assistance control on a condition that a charge state and a discharge state of the first electrical energy accumulator become unknown.

2. The vehicle power supply apparatus according to claim 1, wherein on a condition that the charge state and the discharge state of the first electrical energy accumulator become unknown while the motor assistance control is being executed, the assistance controller inhibits the motor assistance control after gradually reducing powering torque of the electric motor.

3. The vehicle power supply apparatus according to claim 2, further comprising an idling controller configured to execute an idling stop control, the idling stop control including stopping the engine on a condition that a stop condition is satisfied, and starting the engine on a condition that a start condition is satisfied, wherein
   the idling controller inhibits the idling stop control on the condition that the charge state and the discharge state of the first electrical energy accumulator become unknown.

4. The vehicle power supply apparatus according to claim 3, wherein the idling controller inhibits the idling stop control after a start of the engine, on a condition that the charge state and the discharge state of the first electrical energy accumulator become unknown while the engine is stopped.

5. The vehicle power supply apparatus according to claim 4, wherein on a condition that the charge state and the discharge state of the first electrical energy accumulator become unknown while the engine is stopped, the idling controller starts the engine without waiting for the start condition to be satisfied.

6. The vehicle power supply apparatus according to claim 3, wherein on a condition that the charge state and the discharge state of the first electrical energy accumulator become unknown while the engine is stopped, the idling controller starts the engine without waiting for the start condition to be satisfied.

7. The vehicle power supply apparatus according to claim 3, wherein the switch controller controls the switch to the cutoff state on a condition that the electric motor brings the engine to starting rotation.

8. The vehicle power supply apparatus according to claim 3, further comprising a charge and discharge detector that is coupled to the first electrical energy accumulator and detects the charge state and the discharge state of the first electrical energy accumulator, wherein
   the assistance controller inhibits the motor assistance control on a condition that the charge and discharge detector malfunctions.

9. The vehicle power supply apparatus according to claim 2, wherein the switch controller controls the switch to the cutoff state on a condition that the electric motor brings the engine to starting rotation.

10. The vehicle power supply apparatus according to claim 2, further comprising a charge and discharge detector that is coupled to the first electrical energy accumulator and detects the charge state and the discharge state of the first electrical energy accumulator, wherein
    the assistance controller inhibits the motor assistance control on a condition that the charge and discharge detector malfunctions.

11. The vehicle power supply apparatus according to claim 1, further comprising an idling controller configured to execute an idling stop control, the idling stop control including stopping the engine on a condition that a stop condition is satisfied, and starting the engine on a condition that a start condition is satisfied, wherein
    the idling controller inhibits the idling stop control on the condition that the charge state and the discharge state of the first electrical energy accumulator become unknown.

12. The vehicle power supply apparatus according to claim 11, wherein the idling controller inhibits the idling stop control after a start of the engine, on a condition that the charge state and the discharge state of the first electrical energy accumulator become unknown while the engine is stopped.

13. The vehicle power supply apparatus according to claim 12, wherein on a condition that the charge state and the discharge state of the first electrical energy accumulator become unknown while the engine is stopped, the idling controller starts the engine without waiting for the start condition to be satisfied.

14. The vehicle power supply apparatus according to claim 11, wherein on a condition that the charge state and the discharge state of the first electrical energy accumulator become unknown while the engine is stopped, the idling controller starts the engine without waiting for the start condition to be satisfied.

15. The vehicle power supply apparatus according to claim 11, wherein the switch controller controls the switch to the cutoff state on a condition that the electric motor brings the engine to starting rotation.

16. The vehicle power supply apparatus according to claim 11, further comprising a charge and discharge detector that is coupled to the first electrical energy accumulator and detects the charge state and the discharge state of the first electrical energy accumulator, wherein
the assistance controller inhibits the motor assistance control on a condition that the charge and discharge detector malfunctions.

17. The vehicle power supply apparatus according to claim 1, wherein the switch controller controls the switch to the cutoff state on a condition that the electric motor brings the engine to starting rotation.

18. The vehicle power supply apparatus according to claim 1, further comprising a charge and discharge detector that is coupled to the first electrical energy accumulator and detects the charge state and the discharge state of the first electrical energy accumulator, wherein
the assistance controller inhibits the motor assistance control on a condition that the charge and discharge detector malfunctions.

19. A vehicle power supply apparatus to be mounted on a vehicle that includes an engine, the vehicle power supply apparatus comprising:
a first power supply system including a first electrical energy accumulator and an electric device coupled to the first electrical energy accumulator;
a second power supply system including an electric motor coupled to the engine, and a second electrical energy accumulator able to be coupled to the electric motor;
a switch configured to be controlled to an electrically conductive state and a cutoff state, the electrically conductive state including coupling the first power supply system and the second power supply system to each other, and the cutoff state including isolating the first power supply system and the second power supply system from each other; and
circuitry configured to
control the switch to the electrically conductive state and the cutoff state on a basis of an operation state of the electric motor,
control the electric motor to a powering state to execute a motor assistance control, the motor assistance control including providing assistance to the engine,
control the switch to the electrically conductive state on a condition that the motor assistance control is about to be executed, and
inhibit the motor assistance control on a condition that a charge state and a discharge state of the first electrical energy accumulator become unknown.

* * * * *